United States Patent [19]

Konishi

[11] Patent Number: 4,727,601
[45] Date of Patent: Feb. 23, 1988

[54] LOOP-TYPE OPTICAL DATAWAY SYSTEM
[75] Inventor: Kuniyoshi Konishi, Tokyo, Japan
[73] Assignee: Kabushiki Kaisha Toshiba, Kawasaki, Japan
[21] Appl. No.: 694,629
[22] Filed: Jan. 24, 1985
[30] Foreign Application Priority Data
  Jan. 31, 1984 [JP] Japan ................................ 59-15496
[51] Int. Cl.⁴ .............................................. H04B 9/00
[52] U.S. Cl. ............................. 455/612; 350/96.16; 455/601
[58] Field of Search ............... 455/601, 606, 607, 612, 455/617, 9, 10; 350/96.16; 375/3, 4; 379/338, 347

[56]  References Cited
  U.S. PATENT DOCUMENTS

| | | | |
|---|---|---|---|
| 4,241,455 | 12/1980 | Gibner | 455/619 |
| 4,435,849 | 3/1984 | Ilgner et al. | 455/601 |
| 4,581,770 | 4/1986 | Haworth | 455/601 |
| 4,671,608 | 6/1987 | Konishi | 350/96.16 |

FOREIGN PATENT DOCUMENTS

| | | | |
|---|---|---|---|
| 2971 | 7/1979 | European Pat. Off. | 455/612 |
| 55-105454 | 8/1980 | Japan | 455/601 |
| 57-111145 | 7/1982 | Japan | 455/606 |

Primary Examiner—Joseph A. Orsino, Jr.
Attorney, Agent, or Firm—Cushman, Darby & Cushman

[57] ABSTRACT

A loop-type dataway system of the invention has a plurality of data transmission stations connected in a loop in a single optical transmission line. Each station has first and second optical directional couplers, an optical receiver, a gate circuit and an optical transmitter. The first optical directional coupler distributes the light signal received from the optical transmission line into two directions, i.e., to the second optical directional coupler and the optical receiver. The optical receiver photoelectrically converts the output signal distributed from the first optical direction coupler. The gate circuit couples the output signal from the optical receiver and an intra-office send signal. The optical transmitter photoelectrically converts the output signal from the gate circuit and supplies the output signal thereof to the second optical directional coupler. The second optical directional coupler couples the output light signal from the optical transmitter and the output light signal distributed from the first optical directional coupler so as to send the coupled signal to the next stage through the optical transmission line.

7 Claims, 9 Drawing Figures

FIG. 6A OUTPUT OF CABLE 58

FIG. 6B OUTPUT OF OPTICAL TRANSMITTER 52

FIG. 6C OUTPUT OF OPTICAL COUPLER 54

LOOP-TYPE OPTICAL DATAWAY SYSTEM

BACKGROUND OF THE INVENTION

The present invention relates to a loop-type optical dataway system.

A conventional loop-type optical dataway system has a double loop configuration as shown in FIG. 1.

Data transmission stations $13_1, 13_2, \ldots, 13_N$ are connected in optical fiber cables 11 and 12 to form the double loops. Each station $13_i$ ($i=1$ through N) has optical receivers 21 and 22 for performing photoelectric conversion of light signals received from the optical fiber cables 11 and 12, and optical transmitters 31 and 32 for performing electrical/optical conversion of the input signals from the optical receivers 21 and 22 and producing the output light signals supplied to a following circuit through the optical fiber cables 11 and 12.

Data transmission is generally performed through one of the optical fiber cables 11 and 12. Assume that data transmission is being performed through the optical fiber cable 11. Then, a light signal supplied to the station $13_i$ through the optical fiber cable 11 is converted into an electrical signal by the optical receiver 21. A converted output signal from the optical receiver 21 is supplied to a station controller (not shown) and to the optical transmitter 31. The optical transmitter 31 also receives an intra-office send signal from the station controller. The optical transmitter 31 converts the input signal into a light signal. The output light signal from the optical transmitter 31 is supplied to a following circuit through the optical fiber cable 11.

When a fault occurs in the optical fiber cables 11 and 12 or in the station $13_i$, the optical fiber cables 11 and 12 are connected before and after the fault section so as to form U-links (return links). Data transmission can be performed through the line excluding the fault section. FIG. 2 shows a system configuration after system reconfiguration when a fault occurs at the station $13_1$. In FIG. 2, U-links are formed at the stations $13_N$ and $13_2$ before and after the station $13_1$. Thus, the fault station $13_1$ is isolated from the system, and data transmission between the stations $13_2$ through $13_N$ can be performed through the optical fiber cables 11 and 12 (double loops).

In a double loop system as described above, U-links are formed to reconfigurate the system, thus allowing data transmission between stations after a fault occurs. However, system reconfiguration in the prior art can only be performed when the fault occurs in a single station or in a single portion of the cables. Therefore, when two non-consecutive stations, for example, stations $13_1$ and $13_4$ are turned off for maintenance or modification, data transmission cannot be performed between the stations $13_2$ and $13_3$ and stations $13_5$ through $13_N$.

SUMMARY OF THE INVENTION

It is an object of the present invention to provide a loop-type optical dataway system which allows system reconfiguration even if a fault occurs at more than one station.

In order to achieve the above object of the present invention, there is provided a loop-type optical dataway system, comprising:

a single optical transmission line; and a plurality of data transmission stations connected in a loop in said optical transmission line, each of said data transmission stations comprising:

a first optical directional coupler for distributing the light signal received from said optical transmission line into two directions;

an optical receiver for performing photoelectric conversion of one distributed-output light signal from said first optical directional coupler;

a station controller for receiving the output signal from said optical receiver and for producing an intra-office send signal;

a gate circuit for coupling the output signal from said optical receiver and the intra-office send signal;

an optical transmitter for performing electric/optical conversion of the output signal from said gate circuit; and a second optical directional coupler for coupling the output light signal from said optical transmitter and the other distributed-output signal from said first optical directional coupler and for producing a coupled signal to a following station through said optical transmission line.

BRIEF DESCRIPTION OF THE DRAWINGS

Other objects and features of the present invention will be apparent from the following description taken in connection with the accompanied drawings, in which.

DETAILED DESCRIPTION OF THE PREFERRED EMBODIMENT

Figure 1:
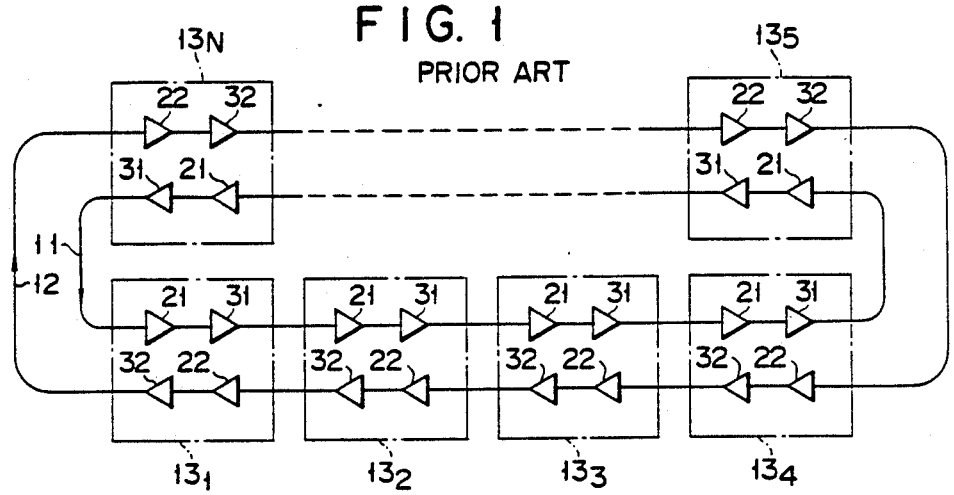
FIG. 1 is a diagram showing a system configuration of a conventional loop-type optical dataway system.
Figure 2:
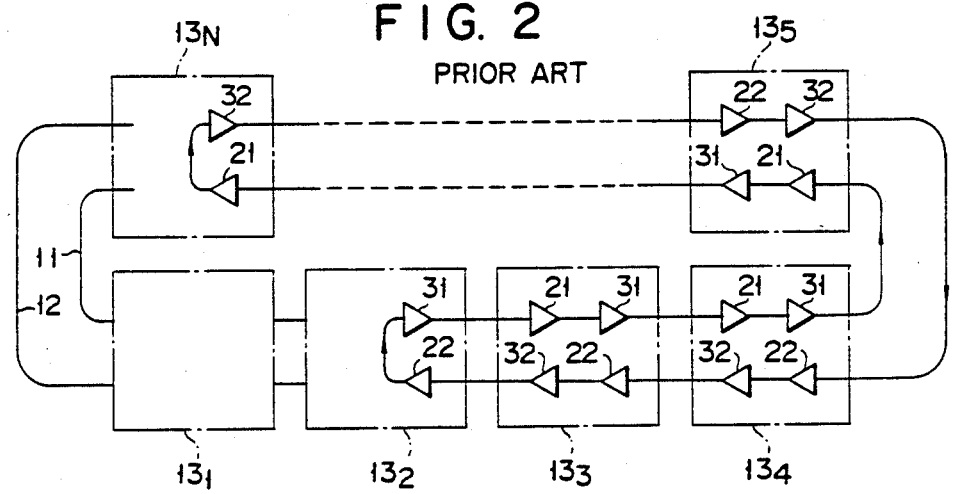
FIG. 2 is a diagram showing an example of reconfiguration of the system shown in FIG. 1.
Figure 3:
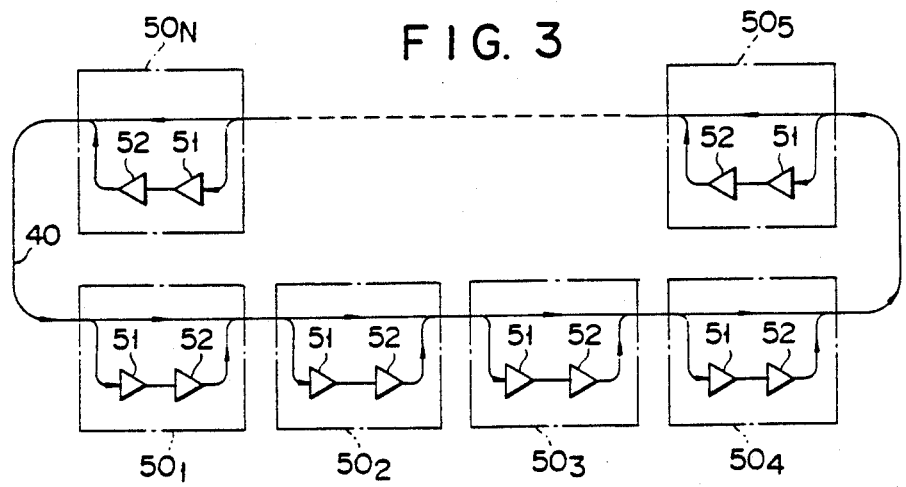
FIG. 3 is a diagram showing a loop-type optical dataway system according to an embodiment of the present invention.

FIG. 3 shows the system configuration of a loop-type optical dataway system according to an embodiment of the present invention. A plurality of data transfer stations $50_1, 50_2, \ldots, 50_N$ are connected in a loop to a single optical fiber cable 40. Each station $50_i$ ($i=1$ through N) has an optical receiver 51 and an optical transmitter 52. The station $50_i$ has a function of transmitting an input light signal received from the optical fiber cable 40 from its upstream side to the downstream side, and a function of repeating an input light signal from its upstream and supplying it to the downstream side using the optical receiver and transmitters 51 and 52.

Figure 4:
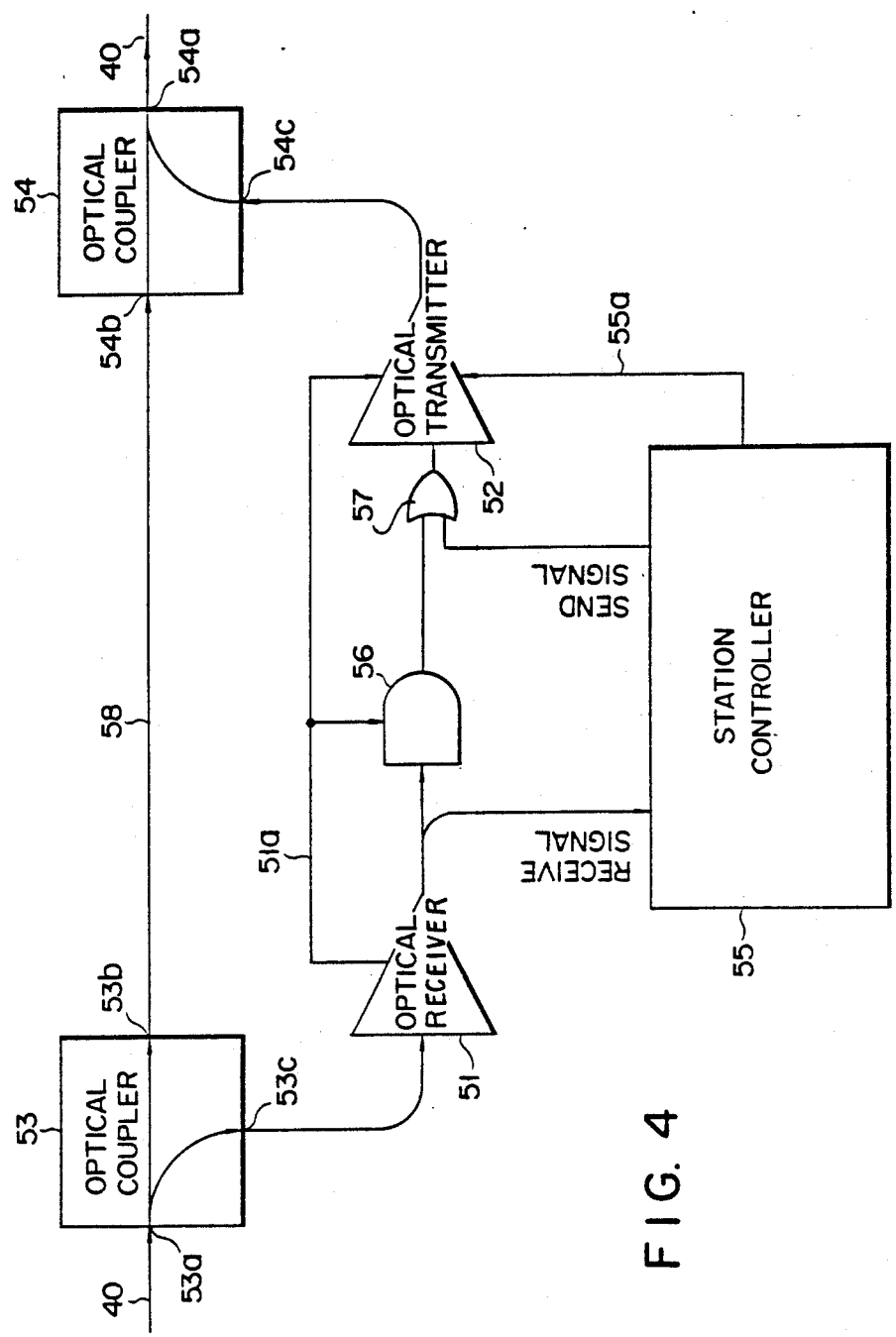
FIG. 4 is a block diagram showing the configuration of a data transmission station shown in FIG. 3.
Figure 7:
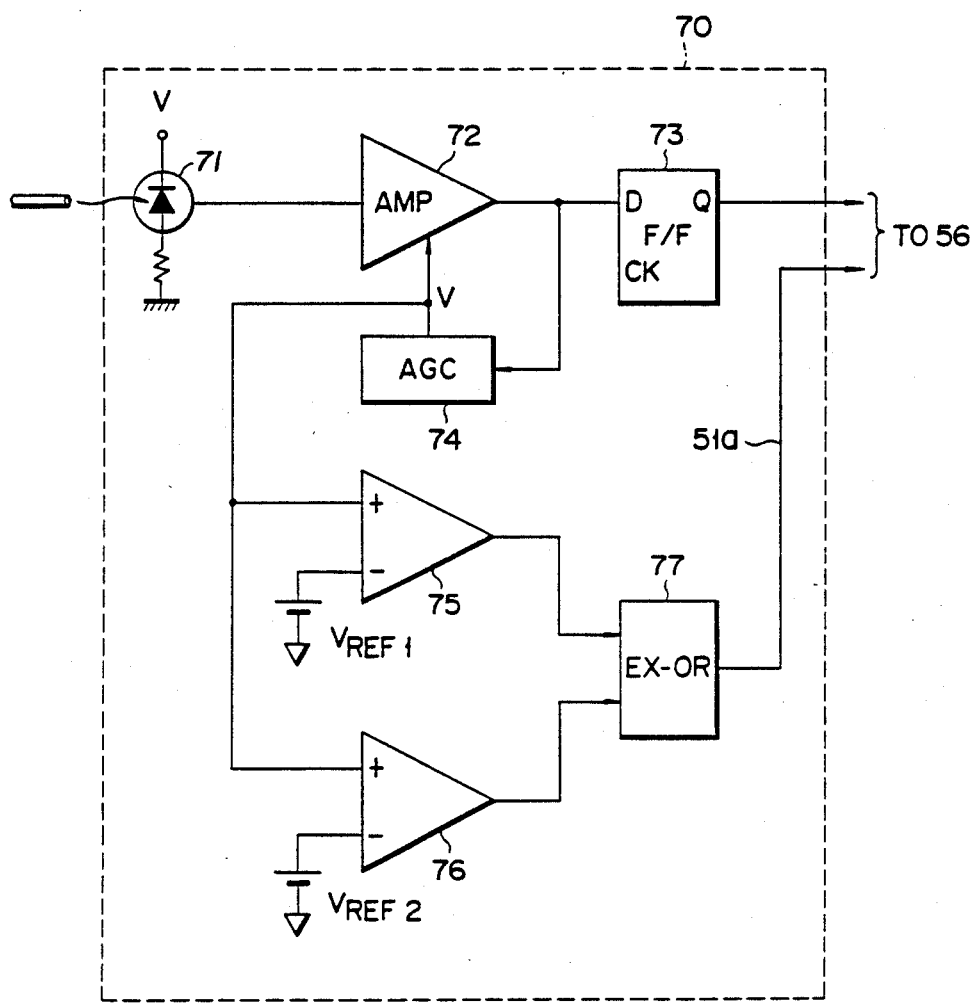
FIG. 7 is a detailed block diagram of a level detector having an optical receiver 51 shown in FIG. 4.

The station $50_i$ for realizing the above function has the configuration as shown in FIG. 4. The station $50_i$ is an optical directional coupler (to be called hereinafter an optical coupler). Optical couplers 53 and 54 have terminals 53a through 53c and 54a through 54c. The terminal 53a of the optical coupler 53 is connected to the optical fiber cable 40. As a result, a light signal supplied to the terminal 53a of the optical coupler 53 through the optical fiber cable 40 is distributed to the terminals 53b and 53c. The optical receiver 51 is connected to the terminal 53c of the optical coupler 53. The optical receiver 51 converts and amplifies the light signal distributed from the terminal 53c into an electrical signal (receive signal) of a predetermined level. The optical receiver 51 has a level detector 70 for indicating if the light signal falls within a predetermined level range (e.g., within −20 dBm to −30 dBm). FIG. 7 shows the level detector 70. The light signal distributed from the output terminal 53c of the optical coupler 53 is subjected to photoelectric conversion by a photodiode 71. The electrical signal is amplified by an amplifier 72. The amplified signal is latched by a flip-flop 73 and is also supplied to an automatic gain control circuit (AGC circuit) 74. The AGC circuit 74 changes the gain in response to a change in an input signal from the amplifier 72 and produces a constant voltage (AGC voltage) V. The AGC voltage V is supplied to first and second voltage comparators 75 and 76. The first comparator 75 compares the AGC voltage with a first reference voltage VREF1 corresponding to the lowest output level (e.g., −20 dBm) of the light signal. When the AGC voltage exceeds the first reference voltage, the first comparator 75 produces a logic "1" signal. If the AGC voltage is below the first reference voltage, the first comparator 75 produces a logic "0" signal. Similarly, the second comparator 76 compares the AGC voltage with a second reference voltage VREF2 corresponding to the highest output level (e.g., −30 dBm) of the light signal. When the AGC voltage exceeds the second reference voltage, the second comparator 76 produces a logic "1" signal. When the AGC voltage is below the second reference voltage, the second comparator 76 produces a logic "0" signal. Output signals from the first and second comparators 75 and 76 are supplied to an exclusive-OR circuit 77. As a result, when the level of the light signal is within the range between −20 dBm and −30 dBm, the exclusive-OR circuit 77 produces a receive level signal 51a indicating that the light signal falls within a predetermined level range.

Referring to FIG. 4, a station controller 55 for performing data transfer control and a repeater gate 56 are connected to the optical receiver 51. An output signal (receive signal) from the optical receiver 51 is supplied to the station controller 55 and the repeater gate 56. The repeater gate 56 also receives the receive level signal 51a from the optical receiver 51. The repeater gate 56 comprises, for example, an AND gate. When the receive level signal 51a is high, i.e., when the light signal falls within the predetermined level range, the repeater gate 56 passes the output signal from the optical receiver 51.

An output signal from the repeater gate 56 and the send signal (intra-office send signal) from the station controller 55 are supplied to the OR gate 57. The gated signal by the OR gate 57 is supplied to the optical transmitter 52. The optical transmitter 52 also receives the receive level signal 51a from the optical receiver 51 and a send designation signal 55a from the station controller 55. The signal 55a is a control signal indicating the presence of the data transmission from the intra-office. The optical transmitter 52 has an output level varying function. Thus, when the signal 55a is logic "1," the optical transmitter 52 converts the output signal from the OR gate 57 into a light signal of a first level (e.g., 0 dBm). When the signal 51a is logic "1" and the signal 55a is logic "0," the optical transmitter 52 converts the output signal from the OR gate 57 into a light signal of a second level (e.g., −10 dBm).

The output of the optical transmitter 52 is connected to the terminal 54c of the optical coupler 54. The terminal 54b of the optical coupler 54 is connected to the terminal 53b of the optical coupler 53 through an optical fiber cable 58 as the internal transmission line. The terminal 54a of the optical coupler 54 is connected to the optical fiber cable 40. As a result, the light signal distributed from the terminal 53b of the coupler 53 is supplied to the terminal 54b of the optical coupler 54 through the cable 58, and the light signal from the optical transmitter 52 is supplied to the terminal 54c of the optical coupler 54. The optical coupler 54 couples the input signals at the terminals 54b and 54c and sends the coupled signal to a downstream station i+1 station through the optical fiber cable 40.

In this manner, according to this embodiment, the light signal transmitted from an upstream station is sent to a downstream station through the optical couplers 53 and 54. Therefore, even if the power supplies for a plurality of non-consecutive stations within the system are turned off, the light signal can be sent to a prescribed station. In addition, if the light signal supplied to the station $50_i$ through the optical fiber cable 40 falls within a range between −20 dBm and −30 dBm, it is amplified to an output level of −10 dBm. Therefore, even if the light signal level is lowered through a fault section, such a level decrease can be conpensated for.

Figure 5:
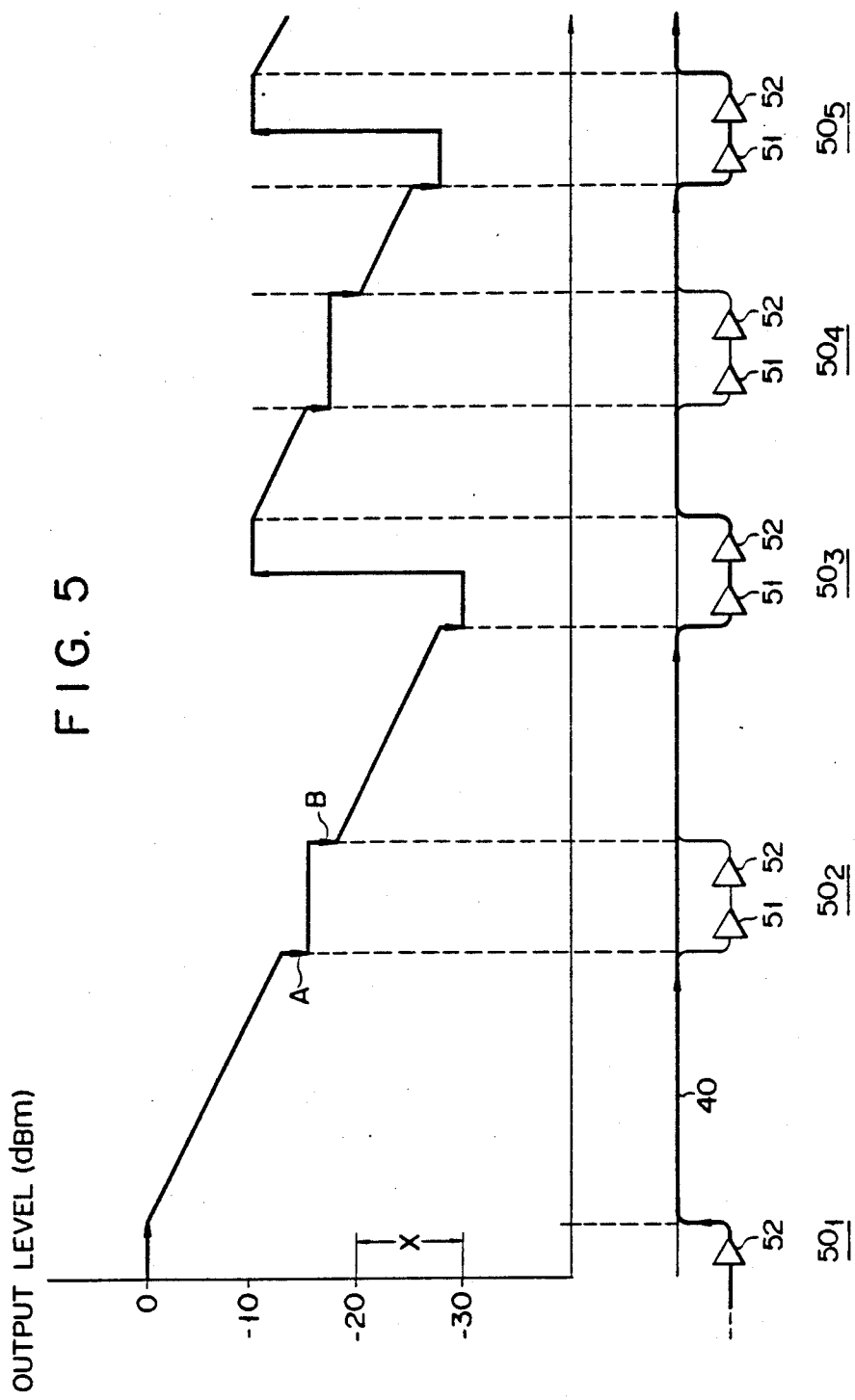
FIG. 5 is a diagram showing changes in output level for explaining the operation of the system shown in FIG. 3.

Assume that the station $50_1$ sends the light signal at an output level of 0 dBm. The light signal from the station $50_1$ is transmitted to the downstream station $50_2$ through the optical fiber cable 40. The level of the light signal from the station $50_1$ is gradually decreased during transmission to the station $50_2$, as shown in a diagram of FIG. 5 which shows changes in an output level (main signal path is also indicated by a thick line herein). The light signal level is further decreased by the optical coupler 53 of the station $50_2$, as indicated by symbol A in FIG. 5. At this time, if the light signal level is higher than −20 dBm as shown in FIG. 5, that is, if it is outside the receive level range X between −20 dBm and −30 dBm to be repeated, the light signal is not repeated by the station $50_2$, but instead simply passes through the optical coupler 54 and sent onto the optical fiber cable 40. The output level of the light signal is decreased as indicated by symbol B in FIG. 5 when it passes through the optical coupler 54.

The light signal passing through the station $50_2$ is tranmitted to the downstream station $50_3$ through the optical fiber cable 40 and is distributed and generated from the terminals 53b and 53c of the optical coupler 53 of the station $50_3$. When the output light signal level from the terminal 53c of the optical coupler 53 falls within the receive level range X to be repeated as shown in FIG. 5, the light signal is amplified up to an output level of −10 dBm and is transmitted to the downstream station $50_4$ through the optical fiber cable 40. When the output light signal level from the terminal 53c of the optical coupler 53 is below −30 dBm, the signal is ignored since it is below the receive level.

Figure 6:
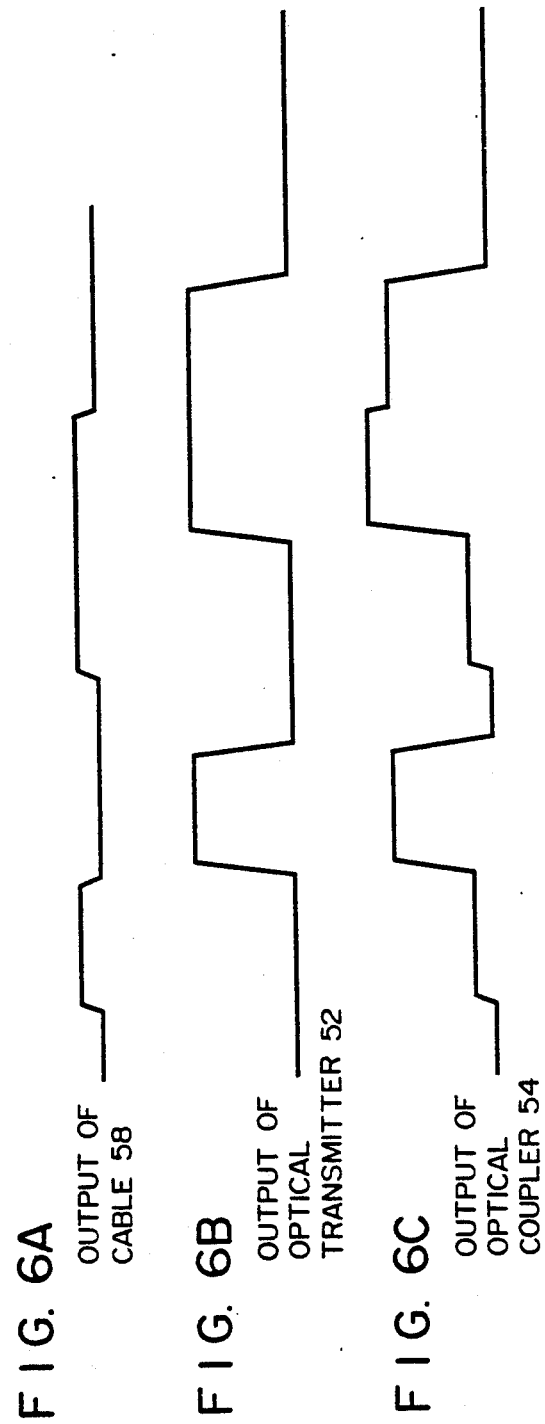
FIGS. 6A through 6C are waveform charts showing examples of waveforms of receive signals including repeater amplification signal components.

FIG. 6A shows a waveform of a passing signal component distributed from, for example, from the terminal 53b of the optical coupler 53 of the upstream station $50_3$. FIG. 6A shows a waveform of a repeated signal component from the optical transmitter 52 of the upstream station $50_3$. FIG. 6C shows a waveform of an output light signal (the passing signal component+the repeated signal component) from the upstream station $50_3$. In this case, the passing signal component shown in FIG. 6A can become a noise component of the receive signal. However, in this embodiment, the repeated output level is high, i.e., −10 dBm in comparison to the maximum value of the receive level range X to be repeated, i.e., −20 dBm. For this reason, a signal component 63 of the receive signal 60 is kept at a sufficient level, and the station $50_i$ can normally receive data.

The above problem can undesirably occur between a send signal and a repeated signal. This occurs when, for example, the send signal from the station $50_1$ is repeated and returned by the station $50_N$ in the transmission interval of the station $50_1$. In the case wherein a distance between the stations $50_1$ and $50_N$ is small, if there is no difference between the signal level sent from the station $50_1$ to the station $50_N$ and the send signal level of the station $50_1$, they cannot be discriminated. However, in this embodiment, since the send signal level is set at 0 dBm with respect to the repeating level of −10 dBm, this problem is resolved.

What is claimed is:

1. A loop-type optical dataway system, comprising:
a single optical transmission line; and
a plurality of data transmission stations connected in a loop in said optical transmission line, each of said data transmission stations comprising:
   a first optical directional coupler for splitting a light signal received from said optical transmission line into first and second distributed light signals;
   an optical receiver for photo-electrically converting said first distributed-output light signal from said first optical directional coupler and providing a receive signal and a receive level signal indicative of a level of the first distributed-output light signal;
   a station controller for receiving the receive signal from said optical receiver and for producing an intra-office send signal;
   a gate circuit for combining the receive signal from said optical receiver and the intra-office send signal from said station controller;
   an optical transmitter responsive to said receive level signal for electrooptically converting the output signal from said gate circuit, said transmitter amplifying the output from said gate circuit to a predetermined level when said receive level signal is present; and
   a second optical directional coupler for coupling the output light signal from said optical transmitter and the second distributed-output light signal from said first optical directional coupler and for producing a coupled signal transmitted to a following station through said optical transmission line.

2. A system according to claim 1, wherein said optical transmitter has an output signal level varying function for receiving the receive level signal from said optical receiver, and for converting the output signal produced by said gate circuit into a light signal of a first level when a send designating signal representing the presence of the intra-office send signal is "true", and for converting the output signal produced by said gate circuit into a light signal of a second level when the receive level signal is "true" and the send designating signal is "false".

3. A system according to claim 1, wherein said optical receiver comprises a level detector which determines whether or not a level of the first distributed-output light signal from said first optical directional coupler falls within a predetermined range and generates said receive level signal when the level of the first distributed-output light signal falls within the predetermined range.

4. A system according to claim 3, further comprising a repeating gate, which is coupled between said optical receiver and said gate circuit, supplied with said signal and the receive level signal both output from said optical receiver, and for passing the receive signal only when the receive level signal represents that the receive signal level falls within the predetermined range.

5. A system according to claim 3, wherein said level detector comprises:
   photodiode means for receiving the first distributed-output light signal and providing a photoelectrically converted signal indicative thereof;
   an amplifier for amplifying the photo-electrically converted signal from said photodiode means;
   an automatic gain control circuit, connected to the output of said amplifier, for generating a constant voltage with respect to a change in an input signal level; and
   first and second comparators having two input terminals to which the constant voltage from the automatic gain control circuit is supplied to one input terminal of each comparator, and upper- and lower-limit values of the predetermined range are supplied to the other respective input terminals therof.

6. A system according to claim 3, wherein each of said data transmission stations comprises:
   a first loop circuit consisting of said first optical directional coupler, said optical receiver, said gate circuit, said optical transmitter, and said second optical directional coupler; and
   a second loop circuit consisting of a station controller connected between said optical receiver and said optical transmitter, the receive signal being transmitted to a downstream side through said first loop circuit when said receive signal falls within said predetermined range, and the receive signal being transmitted to the downstream side through said second loop circuit when the receive signal falls outside the predetermined range.

7. A loop-type optical dataway system, comprising:
a single optical transmission line; and
a plurality of data transmission stations connected in a loop in said optical transmission line, each of said data transmission stations comprising:
   a first optical directional coupler for splitting a light signal received from said optical transmission line into first and second distributed light signals;
   an optical receiver for photo-electrically converting said first distributed-output light signal from said first optical directional coupler and providing a receive signal and a receive level signal indicative of a level of the first distributed-output light signal;
   a station controller for receiving the receive signal from said optical receiver and for producing an intra-office send signal;
   a first gate circuit for receiving the receive signal and receive level signal from said optical receiver, for passing the receive signal when the receive level signal is present, and for blocking the receive signal when the receive level signal is not present;

a second gate circuit for combining the receive signal from said first gate circuit and the intra-office send signal from said station controller;

an optical transmitter responsive to said receive level signal for electrooptically converting the output signal from said gate circuit, said transmitter amplifying the output from said second gate circuit to a predetermined level when said receive level signal is present; and a second optical directional coupler for coupling the output light signal from said optical transmitter and the second distributed-output light signal from said first optical directional coupler and for producing a coupled signal transmitted to a following station through said optical transmission line.

* * * * *